(12) United States Patent
Paulus et al.

(10) Patent No.: US 8,630,038 B2
(45) Date of Patent: Jan. 14, 2014

(54) ILLUMINATION DEVICE FOR A MICROSCOPE

(75) Inventors: Robert Paulus, Hergatz (DE); Reto Zuest, Widnau (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 385 days.

(21) Appl. No.: 12/839,731

(22) Filed: Jul. 20, 2010

(65) Prior Publication Data

US 2011/0026113 A1 Feb. 3, 2011

(30) Foreign Application Priority Data

Jul. 31, 2009 (DE) .......................... 10 2009 028 149

(51) Int. Cl.
*G02B 21/06* (2006.01)
*G02B 21/10* (2006.01)

(52) U.S. Cl.
CPC ..................................... *G02B 21/10* (2013.01)
USPC ......................................... 359/387; 359/385

(58) Field of Classification Search
USPC .................................................. 359/385, 387
See application file for complete search history.

(56) References Cited

U.S. PATENT DOCUMENTS

| 4,729,079 A | 3/1988 | Maylotte |
| 6,059,421 A | 5/2000 | White et al. |
| 8,033,673 B2 * | 10/2011 | Shimokawa et al. ........... 362/18 |
| 2008/0285254 A1 | 11/2008 | Shimokawa et al. |

FOREIGN PATENT DOCUMENTS

| DE | 10 2004 017 545 A1 | 10/2005 |
| DE | 20 2007 012 281 U1 | 12/2007 |
| JP | 56-126705 A | 10/1981 |
| SE | 455 139 | 6/1988 |
| WO | 94/19908 A1 | 9/1994 |
| WO | 01/16585 A1 | 3/2001 |

* cited by examiner

*Primary Examiner* — Jack Dinh
(74) *Attorney, Agent, or Firm* — Hodgson Russ LLP

(57) ABSTRACT

The present invention relates to an illumination device (400) for a microscope (600), including at least one light source (120, 130) and a reflector (410) for providing diffuse illumination, said reflector at least partially surrounding the observation beam path (OA1) between a microscope objective (10) and an object (20) to be observed. The reflector (410) is at least partially elastic and capable of being reversibly transformed from at least a first form to at least a second form.

14 Claims, 7 Drawing Sheets

ILLUMINATION DEVICE FOR A MICROSCOPE

CROSS REFERENCE TO RELATED APPLICATIONS

This application claims priority of the German patent application 10 2009 028 149.5 filed Jul. 31, 2009, the entire disclosure of which is incorporated by reference herein.

FIELD OF THE INVENTION

The present invention relates to an illumination device for a microscope.

BACKGROUND ART

In order to observe reflective objects, particularly metallic objects, it is common to use diffuse incident illumination to obtain a shadow-free image without highlights from light sources. Various devices for providing such diffuse illumination have been described in the prior art.

International Patent Publication WO 94/19908 describes an illumination device for providing diffuse incident illumination, in which a hemispherical translucent dome is illuminated from the outside to produce diffuse illumination in its interior. In International Patent Publication WO 01/16585 A1, an also hemispherical reflector is illuminated from below so as to produce diffuse illumination. Finally, in Japanese Patent Publication JP 56126705 A, a rotating mirror is provided in a hemispherical dome to produce diffuse incident illumination. All of these approaches have the inherent disadvantage that the domes can hardly be adapted to the different working distances required for different objectives (objective lenses).

In order to solve this problem, German Publication DE 20 2007 012 281 U1 teaches to attach a movable cover to the reflector. In this approach, the reflector is cylindrical in shape and is equipped with a light source in its cylindrical wall. This light source illuminates the inner cylinder wall, whereby light is reflected, thereby providing diffuse illumination of the object. The reflector is provided with a movable cover to take into account the different working distances associated with different objectives. This approach has the disadvantage that the cover must be fixed in position according to the working distance, which may hinder focusing and manipulation of the object. Moreover, a fixed clamping connection between the reflector and the cover may result in injury to the user, for example, during focusing of the object, and/or in damage to the reflector, the object, or the objective. In addition, the reflector is large in size and cumbersome to handle. The accessibility to the sample is greatly reduced.

Taking this prior art as a starting point, it is an object to provide an illumination device for a microscope, which produces diffuse incident illumination, is easily adaptable to different working distances, reduces the risk of injury to the user and the risk of damage to equipment, and which allows easy access to the sample and is easy to operate.

According to the present invention, there is provided an illumination device for a microscope having the features and advantageous embodiments described herein.

SUMMARY AND ADVANTAGES OF THE INVENTION

In accordance with the teaching of the present invention, a reflector of an illumination device for a microscope is designed to be at least partially elastic so as to allow reversible deformation, and therefore does not have the disadvantages of the prior art. The at least partially elastic reflector may yield, for example, when during focusing, it strikes a microscope stage, the hand or the finger of the user, or the like. This avoids injury to the user and damage to the reflector or the microscope. It is particularly advantageous that the two spatial forms into which the reflector may be transformed are selected such that one spatial form allows the object to be covered as completely as possible and, at the same time, to be diffusely illuminated as uniformly as possible, while the other spatial form provides access to the object. For example, the reflector may be transformed, for example folded, inverted or the like, from a first, closed spatial form into a second, open spatial form. Thus, the reflector; i.e., the illumination device, is easy to operate, and yet is capable of covering the object and of being adapted to different working distances, while helping to avoid injury and damage. In particular, the sample or preparation is easily accessible, for example, for manipulation or replacement thereof, without having to change the focus. This facilitates the handling enormously. In particular, serial examinations, during which a number of samples are observed, can be performed particularly quickly.

Fabricating the reflector from plastic facilitates ease of manufacture and a reduction in weight. However, the reflector may also be made from other materials, such as rubber, metal, textile fabric, or other materials or a combination thereof. For example, the reflector may be made of a "milky" transparent material having a reflective coating applied to the exterior thereof so as to achieve a high light efficiency combined with a high level of diffusion. Similarly, a matte lacquer of bright, neutral color applied to the inner surface of the reflector may also assist in the light diffusion. Other embodiments capable of producing diffuse illumination are also possible.

Advantageously, the reflector is rotationally symmetric, surface-symmetric, or axially symmetric around the axis of the objective; i.e., the optical axis of the microscope. In addition, or alternatively, the reflector may have a smaller opening at the objective end and a larger opening at the object end. This provides uniform diffuse illumination of the object, while allowing it to be observed at the same time, for example, through an objective. The opening at the objective end and the opening at the object end may also be similar or identical in size. In that case, the reflector has its largest extension in a region between the opening at the object end and the opening at the objective end, and thus its spatial form corresponds, at least approximately, to that of a sphere or an ellipsoid of revolution.

In a practical embodiment, the reflector has substantially the spatial form of a sphere, an ellipsoid of revolution, a hemisphere, a dome, a bell, an elliptic paraboloid, a paraboloid of revolution, or of a hyperboloid of revolution, or is at least partially composed of surface elements of such spatial forms. These spatial forms, on the one hand, provide a uniform reflector surface to produce a preferably diffuse illumination and, on the other hand, can be manufactured relatively easily, for example, as injection-molded parts.

Advantageously, at least one light source is annular and is disposed at an inner surface of the reflector. In particular, the light source may be formed by an LED ring, or by individual LEDs evenly or irregularly spaced apart along a circumference of the inner surface of the reflector. Fluorescent or (cold) cathode lamps or tubes are also suitable. The light source is arranged such that it illuminates at least a portion of the inner surface of the reflector, causing the light to be reflected to provide diffuse illumination of the object. In a particularly preferred embodiment, two annular light sources are provided at the inner surface of the reflector. In particular, the light sources may be disposed adjacent the opening at the objective end and the opening at the object end so as to enable uniform illumination of the entire inner surface of the reflector. If the light sources are controllable or adjustable in brightness, it is thereby possible to move the centroid of illumination over the inner surface so as to adapt the illumination to the object to be observed. In this manner, a uniform, shadow-free illumination can be achieved.

It is advantageous if the reflector has at least two portions which are linked by a joint and positionable relative to each other with respect to the joint. In particular, the position of the portions relative to each other may then define the spatial form of the reflector.

Suitably, the joint is defined by an elastically deformable material. In particular, a plastic material of suitable thickness may advantageously be used for this purpose. The other portions of the reflector can be made from the same material, but with a greater thickness, which allows said portions to be manufactured in a particularly simple manner, such as by injection molding.

Advantageously, at least one of the portions is at least partially flexible. However, suitably, the flexibility of such a portion does not come up to that of the joint. There are embodiments in which one portion is rigid and another portion is flexible, or in which a plurality or all of the portions are flexible. In the first-mentioned embodiment, by suitably disposing a light source, the object can be illuminated even when one or more flexible portions are deformed, especially to allow access to the object. In the last-mentioned embodiment, by deforming all flexible portions, on the one hand, access to the object is improved, and, on the other hand, the reflector can be packed away and stored in a space-efficient manner.

A microscope according to the present invention for observing an object includes an illumination device according to the present invention. The microscope is designed, in particular, as a stereomicroscope or as a normal incident light or compound microscope.

Further advantages and embodiments of the present invention will become apparent from the following description and the accompanying drawings.

It will be understood that the aforementioned features and those described below can be used not only in the specified combinations, but also in other combinations or alone without departing from the scope of the present invention.

The subject matter of the present invention is depicted schematically in the drawings using exemplary embodiments, and will be described below in detail with reference to the drawings.

DETAILED DESCRIPTION OF THE INVENTION

Figure 1:
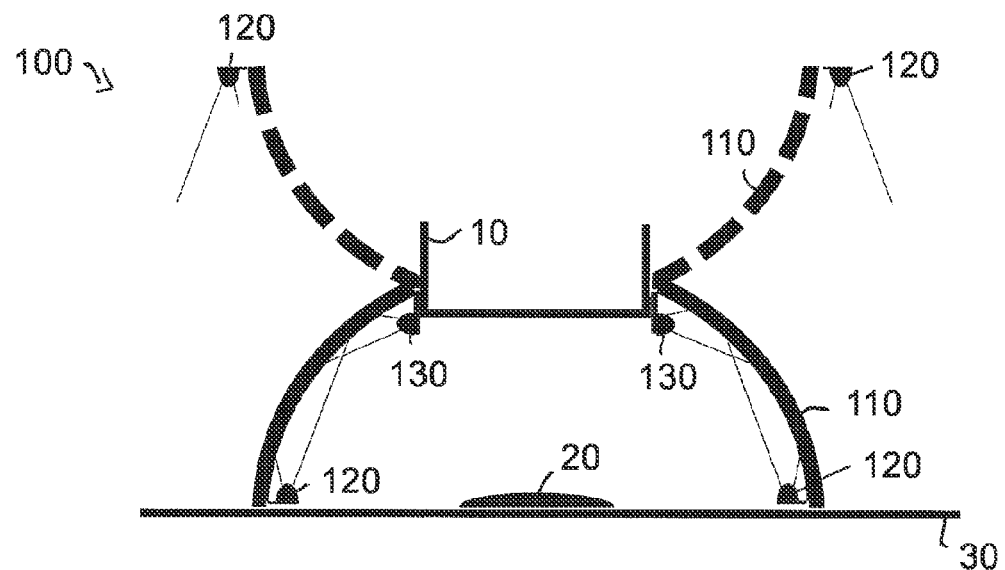
FIG. 1 is a schematic cross-sectional view of a first preferred embodiment of an illumination device of the present invention, shown in a first spatial form and a second spatial form.

In FIGS. 1 through 10, like elements are provided with like reference numerals. Unless otherwise, the description of these elements applies to all embodiments shown. The radiation cones of the light sources shown are partly indicated by dotted lines.

In FIG. 1, a first preferred embodiment of an illumination device of the present invention is shown in a schematic cross-sectional view and denoted as a whole by 100. Illumination device 100 is attached to a microscope objective 10 for observing an object 20 on a microscope stage 30. The attachment may be accomplished, for example, using a clamping screw. It is also possible to provide a thread, or the like, allowing the illumination device to be attached to the objective and/or other components of a microscope. This applies to all embodiments.

Figure 10:
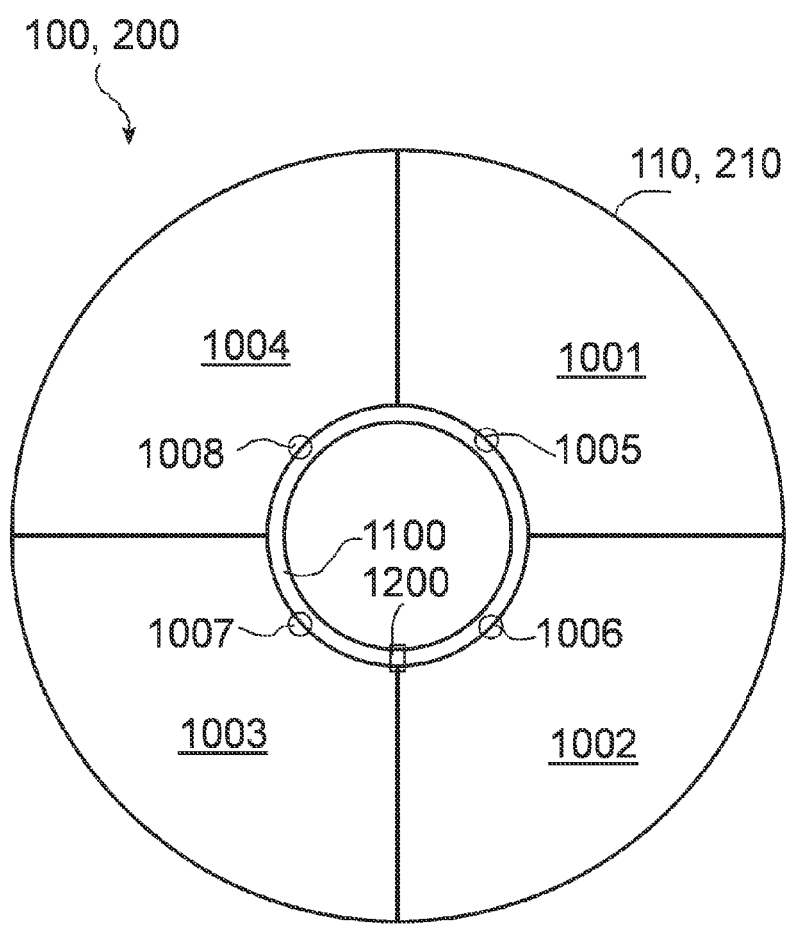
FIG. 10 is a schematic top view showing possible embodiments of the illumination devices according to FIGS. 1 and 2.

In the embodiment shown, illumination device 100 includes a reflector 110, which is substantially entirely flexible. The first spatial form of the reflector is indicated by a solid line, while its second spatial form is indicated by a dashed line. In the example shown, the transformation is accomplished by inverting reflector 110 from the first spatial form to the second spatial form. The reflector may be a single piece or formed of a plurality of elements which, in particular, may be in the shape of a spherical quadrangle, as shown in FIG. 10 by way of example.

Reflector 110 is provided at its inner surface with two light sources 120 and 130. Light sources 120 and 130 are here in the form of individual LED light sources uniformly spaced in an annular array, the light sources 120 and 130 being independently adjustable in brightness. It may be possible to adjust both the overall brightness of light sources 120 and 130 and the individual brightness of each of the LEDs. The electrical connection of and power supply to the light sources can be accomplished without difficulty by those skilled in the art and, therefore, will not be described in greater detail herein.

When reflector 110, and thus the illumination device, is in the first spatial form (hereinafter also referred to as "closed spatial form"), object 20 is shaded from ambient light and is illuminated only by the diffuse light produced by the inner surface of the reflector.

Figure 2:
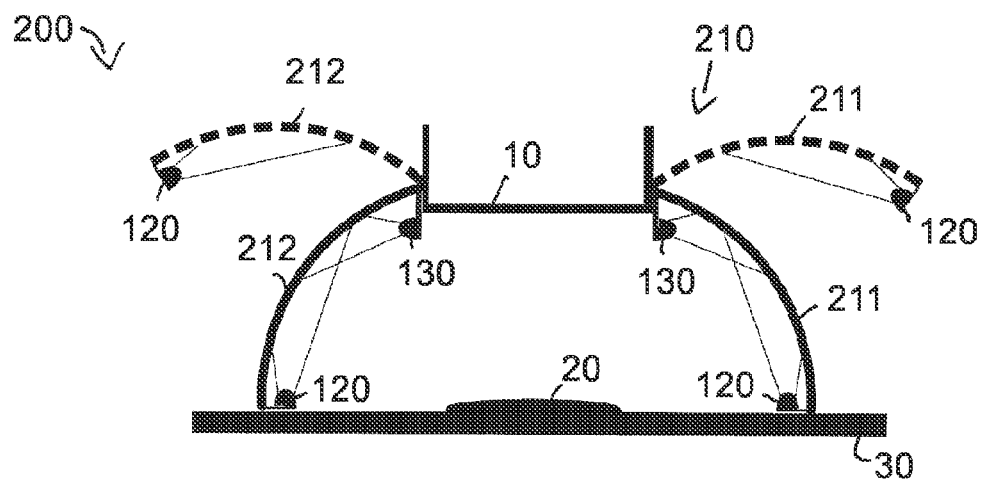
FIG. 2 is a schematic cross-sectional view of a second preferred embodiment of an illumination device of the present invention, shown in a first spatial form and a second spatial form.

FIG. 2 shows a further embodiment 200, in which hemispherical reflector 210 is formed of a plurality of flexible elements 211, 212. The flexible elements are shaped as surface elements of a hemisphere, in particular in the shape of a spherical quadrangle. The transformation is accomplished by folding the individual segments 211, 212 back. A top view of reflector 210 is shown in FIG. 10.

Figure 3:
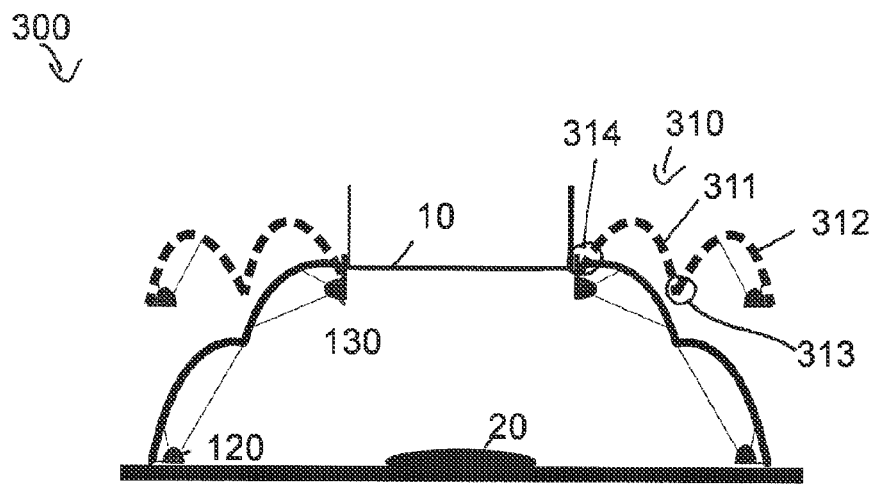
FIG. 3 is a schematic cross-sectional view of a third preferred embodiment of an illumination device of the present invention, shown in a first spatial form and a second spatial form.
Figure 4:
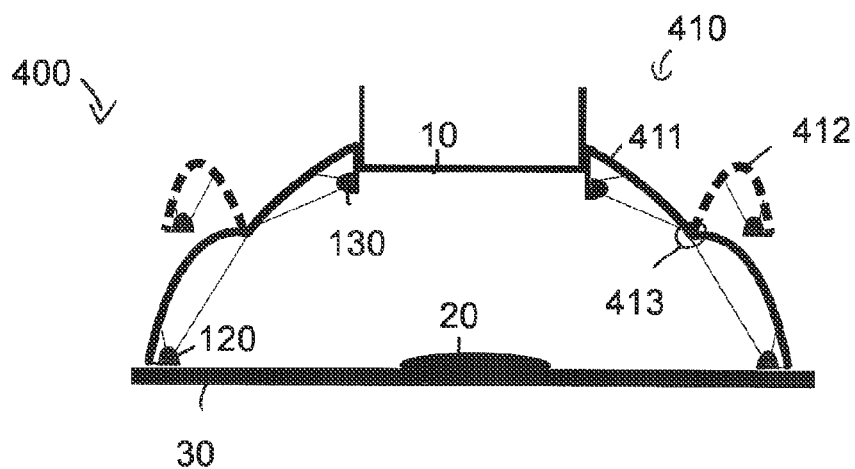
FIG. 4 is a schematic cross-sectional view of a fourth preferred embodiment of an illumination device of the present invention, shown in a first spatial form and a second spatial form.

FIGS. 3 and 4 show two embodiments of an illumination device 300, 400 according to the present invention, whose reflectors 310 and 410 are substantially bell-shaped. Reflectors 310 and 410 each have a first portion 311 or 411, and a second portion 312 or 412, which are linked by a joint 313 or 413, respectively. Portions 311, 312 and 412 are flexible, whereas portion 411 is rigid. Illumination device 300 further has a joint 314 connecting reflector 310 to the mounting means, for example a clamping ring, on objective 10.

When in its first, closed spatial form, embodiment 300 of FIG. 3 produces a diffuse illumination of object 20. The second, open spatial form makes it possible to provide the greatest possible access to object 20 without the need to change the distance between the object and the objective for this purpose. Moreover, when in the second, open spatial form, illumination device 300 occupies little space, which is advantageous, in particular, for storage purposes.

FIG. 4 shows an illumination device 400 which, in the first, closed spatial form, corresponds to illumination device 300 according to FIG. 3. However, when in the second, open spatial form, illumination device 400 differs from illumination device 300. Because portion 411 is rigid, a diffuse illumination of object 20 is maintained in the second spatial form, thus enabling simultaneous observation and manipulation of the object.

Figure 5:
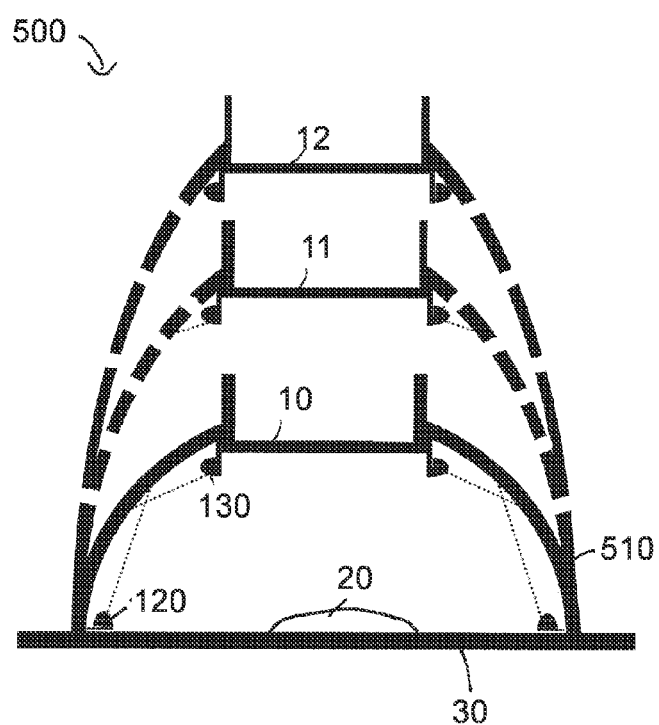
FIG. 5 is a cross-sectional view of a fifth preferred embodiment of an illumination device of the present invention, shown in three different spatial forms.

In FIG. 5, a fifth preferred embodiment of an illumination device of the present invention is shown in a first, second, and third spatial form in a schematic cross-sectional view and denoted as a whole by 500. The first spatial form is indicated by a solid line, the second spatial form is represented by a short-dashed line, and the third spatial form is indicated by a long-dashed line. Reflector 510 of illumination device 500 is substantially entirely flexible and has a very high degree of elasticity. This allows for attachment to objectives 10, 11, and 12 having different working distances, and yet allows object 20 to be substantially completely screened from the environment. In the case of embodiment 500 shown, the first, second and third positions are all closed positions. An open position can be attained, for example, by the user lifting the lower edge of reflector 510.

Figure 6:
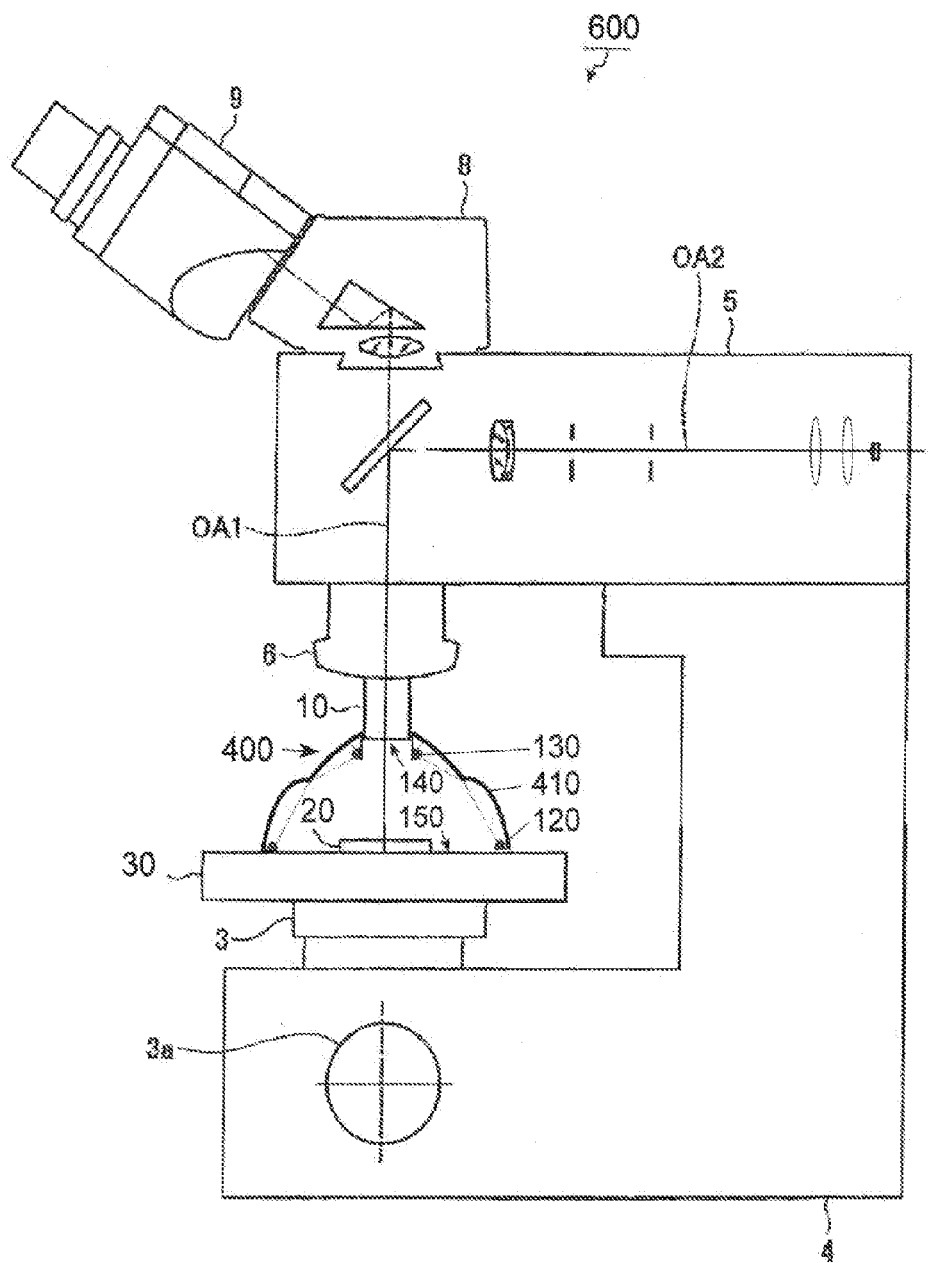
FIG. 6 is a schematic side view of a preferred embodiment of a microscope according to the present invention having an incident illumination device.

In FIG. 6, a microscope for examining a sample or object 20 is shown schematically in a cross-sectional view and denoted as a whole by 600. The microscope has a microscope body 4 to which a microscope stage 30 is mounted by a support member 3. Sample 20 is placed on microscope stage 30 and can be moved vertically using an adjustment means in the form of a rotary wheel 3a. An objective 10 is provided on an objective holder 6. Illumination of sample 20 is accomplished, inter alia, by an incident illumination device 5, which is not further described herein. Moreover, microscope 600 is equipped with embodiment 400 of the illumination device according to the present invention. Illumination device 400 has a smaller opening 140 at the objective end and a larger opening 150 at the object end.

Illumination device 400 is attached to objective 10, for example, by a clamping screw. Bell-shaped, partially elastic reflector 410 is provided at its inner surface with two light sources 120 and 130. Light sources 120 and 130 are here in the form of individual LED light sources uniformly spaced in an annular array, the light sources 120 and 130 being adjustable in brightness independently of each other. It may be possible to adjust both the overall brightness of light sources 120 and 130 and the individual brightness of each of the LEDs. Light sources 120 and 130 illuminate the inner surface of reflector 410, where the light is diffusely scattered to subsequently illuminate object 20 substantially uniformly from all directions. The illuminating light reflected from sample 20 travels along the observation beam path through a tube 8 to eyepiece 9. The optical axis of the observation beam path is denoted by OA1.

Figure 7:
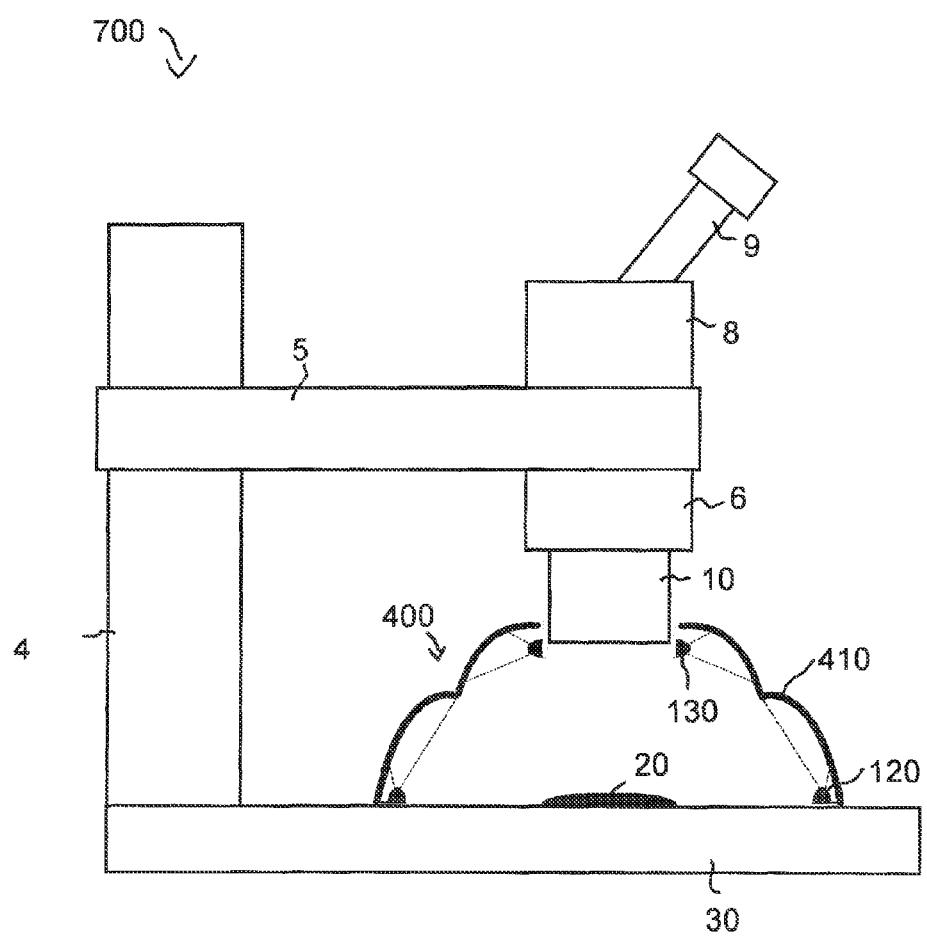
FIG. 7 is a schematic side view of a preferred embodiment of a stereomicroscope according to the present invention having an incident illumination device.

In FIG. 7, a stereomicroscope for examining a sample 20 is shown schematically in a cross-sectional view and denoted as a whole by 700. The functionality of the elements of stereomicroscope 700 is substantially the same as the functionality of the elements of microscope 600 shown in FIG. 6 and, therefore, such elements are given the same reference numerals and are not described again. In this regard, reference is made to the description of FIG. 6.

Figure 8:
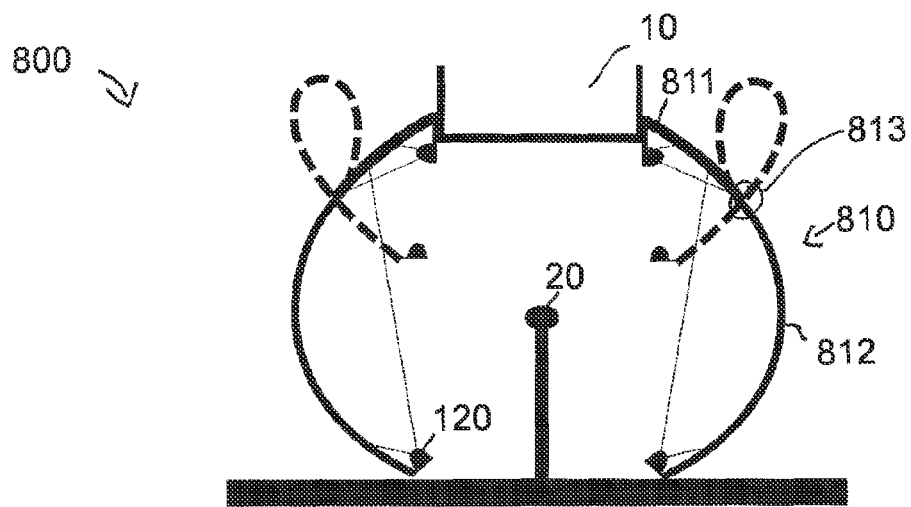
FIG. 8 is a schematic cross-sectional view of a sixth preferred embodiment of an illumination device of the present invention, shown in a first spatial form and a second spatial form.
Figure 9:
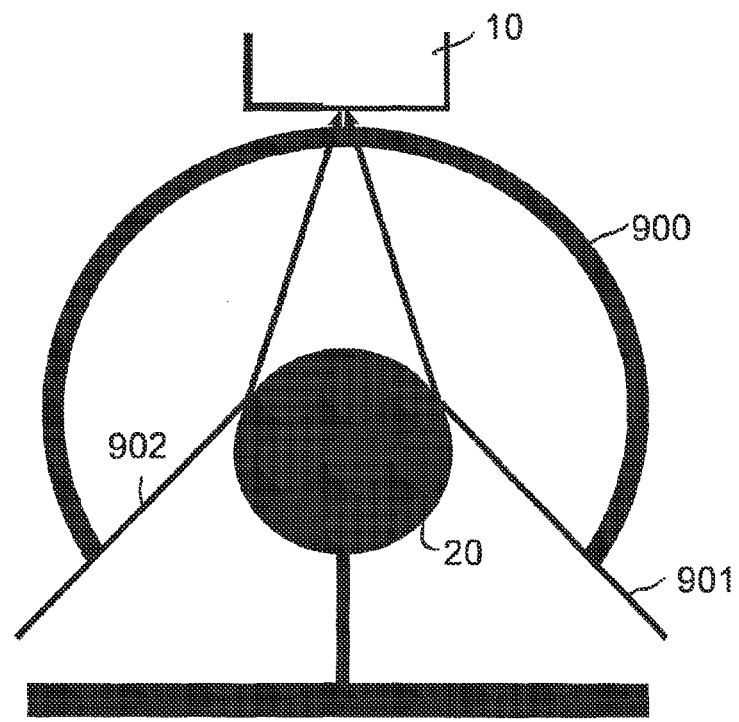
FIG. 9 is a cross-sectional schematic illustrating the principle of spherical object illumination.

The incident illumination device of the present invention is also suitable for substantially spherical illumination of objects, as illustrated with reference to FIG. 8. The desired diffuse illumination is provided from substantially all spatial directions (360°). The previously described, substantially shell-like or dome-shaped embodiments enable bright-field illumination of the sample from within no more than 0°-90° or 270°-360°, respectively. However, for certain sample geometries, such as spherical samples, it may be advantageous to increase the angular range within which light is incident on the sample. In order to increase the angular range of the bright-field illumination, there is proposed an embodiment as shown in FIG. 8. The resulting advantages are that the solid angle space for the bright-field illumination is increased while the sample is maintained accessible without defocusing the microscope. The principle of increasing the solid angle will be explained later with reference to FIG. 9.

Illumination device 800 shown in FIG. 8 includes a substantially spherical reflector 810 having substantially equally sized openings at the top and bottom. Reflector 810 includes a rigid portion 811 and a flexible portion 821, which are linked by a joint 813 so as to be transferred from the first spatial form to a second spatial form. The spherical form allows the illumination angle to be increased, the principle of which is described in FIG. 9 with reference to a reflector 900 and a spherical sample 20. Because of the spatial form of the reflector in conjunction with the spatial form of the sample, even rays of light 901, 902 from solid angles greater than 90° or smaller than 270° with respect to the optical axis can reach the objective.

It is only by using an illumination device according to the present invention that an illumination of this kind can be implemented in practice. With conventional illumination devices having rigid reflectors, a sample 20 located on a raised support 30 is difficult to remove from the reflector because frequently the support cannot be lowered far enough, or because the objective cannot be raised far enough for this purpose. This is particularly where the present invention provides particular advantages because it enables special illumination methods not found in the prior art. When the reflector is transformed to the second, open spatial form, sample 20 located on raised support 30 can easily be manipulated and, in particular, replaced without the need to change the set distance between the support and the objective. Once the manipulation of the sample is completed, the reflector is transformed back to the first, closed spatial form so as to provide diffuse illumination.

In FIG. 10, a possible embodiment of illumination device 100 according to FIG. 1 and a possible embodiment of illumination device 200 according to FIG. 2 are shown in the first spatial form in a top view along the optical axis. As also shown in FIGS. 1 and 2, the first spatial form of illumination device 100 corresponds to the first spatial form of illumination device 200. Reflectors 110 and 210 shown in FIG. 10 are each formed of a plurality of contiguous surface elements 1001 through 1004 which, in the example shown, are in the shape of a spherical quadrangle. Elements 1001 through 1004 may overlap each other or be directly adjacent to each other. Illumination devices 100 and 200 have a clamping ring 1100 and a clamping screw 1200 allowing them to be attached, for example, to an objective.

In the embodiment 100 shown in FIG. 10, the individual elements 1001 through 1004 are inverted to transform reflector 110 from the first spatial form to the second spatial form. In the embodiment 200 shown in FIG. 10, the individual elements 1001 through 1004 are suitably flexibly linked to clamping ring 1100 by a point on their upper edge in a joint-like manner, said points being denoted in FIG. 10 by 1005 through 1008.

Since the reflectors are at least partially flexible, the illumination devices of the present invention can be adapted to a plurality of working distances. Moreover, it is possible to avoid injury to the user and damage to the microscope or the illumination device. In particular, the preparation can be easily accessed without having to change the focus.

It will be understood that the embodiments shown in the Figures are merely illustrative of the present invention, and that the present invention may be embodied in any other form without departing from its scope. This applies particularly to the rigid or elastic portions, the number and size of openings, the number and arrangement of light sources, etc.

What is claimed is:

1. An illumination device for a microscope having an observation beam path between an objective of the microscope and an object to be observed, the illumination device comprising:
    at least one light source; and
    a reflector for providing diffuse illumination of the object to be observed, the reflector at least partially surrounding the observation beam path and the object to be observed,
    wherein at least a part of the reflector is elastic such that the reflector is capable of being reversibly transformed from a first spatial form to a second spatial form.

2. The illumination device as recited in claim 1, wherein the reflector is rotationally symmetric, surface-symmetric, or axially symmetric about an optical axis of the observation beam path.

3. The illumination device as recited in claim 2, wherein the first spatial form of the reflector is an ellipsoid of revolution, a sphere, a hemisphere, a bell, a dome, an elliptic paraboloid, a paraboloid of revolution, or of a hyperboloid of revolution, or is at least partially composed of surface elements of such spatial forms.

4. The illumination device as recited in claim 1, wherein the at least one light source includes an annular light source disposed at an inner surface of the reflector.

5. The illumination device as recited in claim 4, wherein the at least one light source includes two annular light sources disposed at the inner surface of the reflector.

6. The illumination device as recited in claim 1, wherein the reflector has at least two portions which are linked by a joint and positionable relative to each other with respect to the joint.

7. The illumination device as recited in claim 6, wherein the joint is defined by an elastically deformable material.

8. The illumination device as recited in claim 6, wherein at least one of the portions is at least partially flexible.

9. The illumination device as recited in claim 1, having a smaller opening at an objective end thereof and a larger opening at an object end thereof.

10. A microscope for observing an object, the microscope comprising:
    an objective and an observation beam path between the objective and the object to be observed; and
    an illumination device including at least one light source and a reflector for providing diffuse illumination of the object to be observed, the reflector at least partially surrounding the observation beam path and the object to be observed,
    wherein at least part of the reflector is elastic such that the reflector is capable of being reversibly transformed from a first spatial form to a second spatial form.

11. The microscope as recited in claim 10, wherein the microscope is a compound microscope or a stereomicroscope.

12. The microscope as recited in claim 10, further comprising a stage arranged to support the object to be observed, wherein, when the reflector is in the second spatial form, the object to be observed can be manipulated by a user without changing a distance between the objective and the stage.

13. A method for manipulating an object to be observed in a microscope, wherein the microscope includes an objective, an observation beam path between the objective and the object to be observed, a support carrying the object, and an illumination device having at least one light source and a reflector for providing diffuse illumination of the object to be observed, the reflector at least partially surrounding the observation beam path and the object to be observed, the method comprising the steps of:
    transforming the reflector of the illumination device from a first spatial form to a second spatial form by engaging an elastic portion of the reflector, wherein the step of transforming is performed while maintaining a set distance between the objective and the support carrying the object, wherein the set distance is a distance set for observing the object in the microscope; and
    manipulating the object.

14. The method as recited in claim 13, further comprising the step of transforming the reflector of the illumination device from the second spatial form back to the first spatial form after the step of manipulating the object is completed.

\* \* \* \* \*